Figure 2:
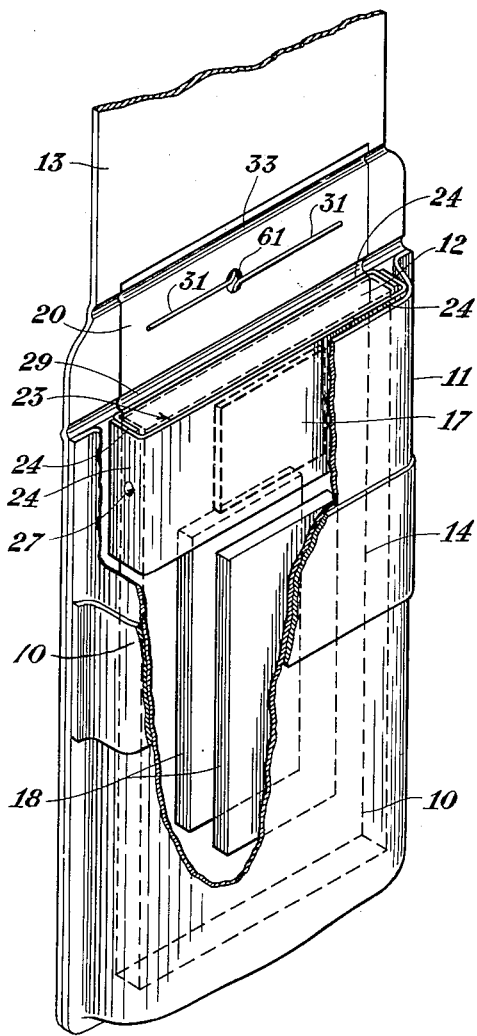

Sept. 11, 1956

P. A. MUTO ET AL 2,762,929

CONTAINER FOR SENSITIZED FILM AND
METHOD OF MANUFACTURE THEREOF

Filed Aug. 23, 1952

3 Sheets-Sheet 1

INVENTORS
PETER A. MUTO
WILLIAM V. RAUSCHER by Fred M. Vogel

AGENT

Sept. 11, 1956  P. A. MUTO ET AL  2,762,929
CONTAINER FOR SENSITIZED FILM AND
METHOD OF MANUFACTURE THEREOF
Filed Aug. 23, 1952  3 Sheets-Sheet 2

INVENTORS
PETER A. MUTO
WILLIAM V. RAUSCHER by Fred M. Vogel
AGENT

Sept. 11, 1956 P. A. MUTO ET AL 2,762,929
CONTAINER FOR SENSITIZED FILM AND
METHOD OF MANUFACTURE THEREOF
Filed Aug. 23, 1952 3 Sheets-Sheet 3

INVENTORS
PETER A. MUTO
WILLIAM V. RAUSCHER
by Fred M. Vogel
AGENT

United States Patent Office 2,762,929
Patented Sept. 11, 1956

---

2,762,929

CONTAINER FOR SENSITIZED FILM AND METHOD OF MANUFACTURE THEREOF

Peter A. Muto, Livingston, and William V. Rauscher, Highlands, N. J., assignors to Amperex Electronic Corporation, Hicksville, N. Y.

Application August 23, 1952, Serial No. 305,954

5 Claims. (Cl. 250—83)

---

The present invention relates to containers for sensitized films and to a method of making the same. More particularly, the invention relates to substantially waterproof containers for sensitized films which have frangible sacs of a processing or developing agent.

Special small sensitized films, some of which are of the fast-processing type, have been developed for indicating the extent of the exposure of an individual to the effects of atomic fission, and it has been proposed to enclose such films in a container which may be worn by members of the armed forces. In order to make these containers available to as many military, or even civilian personnel, as possible, the container should, therefore, be relatively inexpensive. Furthermore, it is desirable that such film containers be compact, light in weight, and substantially water-proof and dust-proof in order to protect the film. In addition, they should preferably be relatively inconspicuous in order that they may be worn in a convenient manner like the so-called "dog tag."

Some of the sensitized films under consideration are ordinarily assembled with a processing or developing agent contained in a frangible sac mounted adjacent the sensitized portion of the film so that when the sac is broken the containers will cover the exposed film. Prior to developing the film, the frangible sac must be retained in the film container so as to be adequately protected against accidental pressure which might rupture the sac. Prior containers and proposed containers of the type under consideration which are capable of protecting the sac, and possess some of the other desirable characteristics mentioned above, have been bulkier, heavier, and more costly than is desired.

The main object of the present invention, therefore, is to provide a new and improved sensitized-film container which avoids one or more of the above-mentioned disadvantages of known containers.

Another object of the invention is to provide a new and improved sensitized-film container which is simple in construction, consists of relatively inexpensive and readily available materials, and lends itself to being manufactured in mass production.

It is still another object of the present invention to provide a new and improved sensitized-film container which is substantially dust-proof and water-tight, is small and light in weight, and may be readily worn in a relatively inconspicuous manner.

In accordance with the invention, a container for a sensitized film comprises a flat pouch of substantially water-proof flexible material having an opening to permit the insertion and removal of the sensitized film and including a flap and a fastener for securing the flap over the opening to form a substantially water-tight closure. The container also includes a pair of elements having a predetermined permeability to X or gamma rays individually secured to two opposed walls of the pouch for controlling the extent of X or gamma rays striking the sensitized film when it is located in the pouch between the elements.

In accordance with a particular form of the invention, a container for a sensitized film which has a frangible sac of a processing agent positioned in proximity thereto, comprises a substantially flat pouch of substantially water-proof flexible material having an opening therein to permit the insertion and removal of the sensitized film and including a flap and a fastener therefore which closes the opening to form a substantially water-tight and dust-proof closure. The container also includes a pair of shielding elements having a predetermined permeability to X or gamma rays individually secured to opposed walls of the pouch and a rigid hollow member secured to the pouch in a position to protect the sac from accidental rupture when the sensitized film and sac are disposed within the pouch with the sensitized film positioned between the elements.

Figure 1:
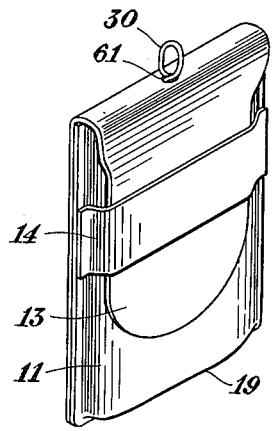
Figure 3:
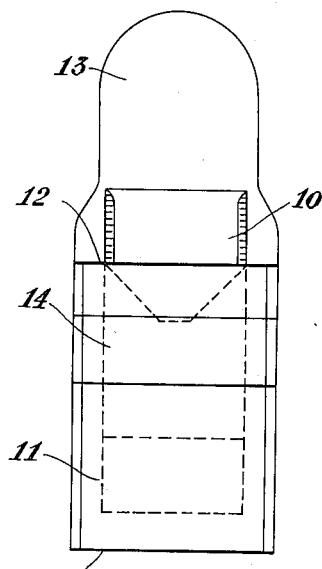
Figure 4:
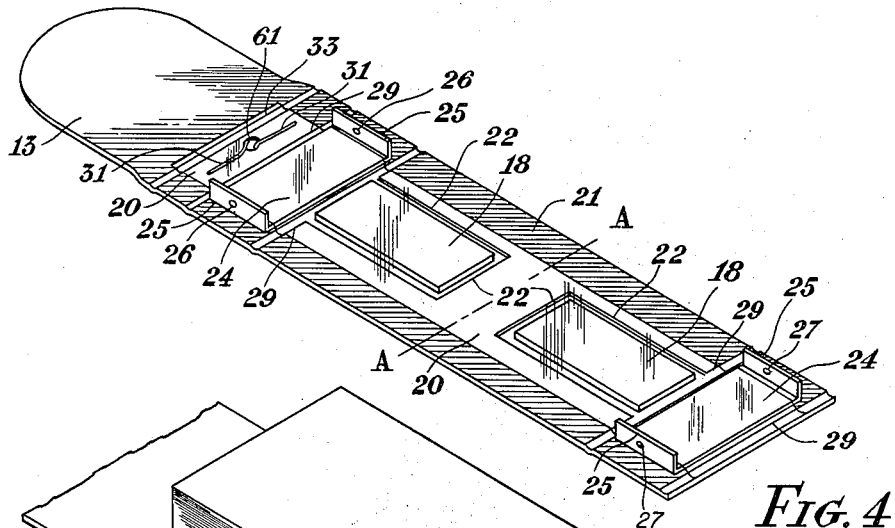
Figure 5:
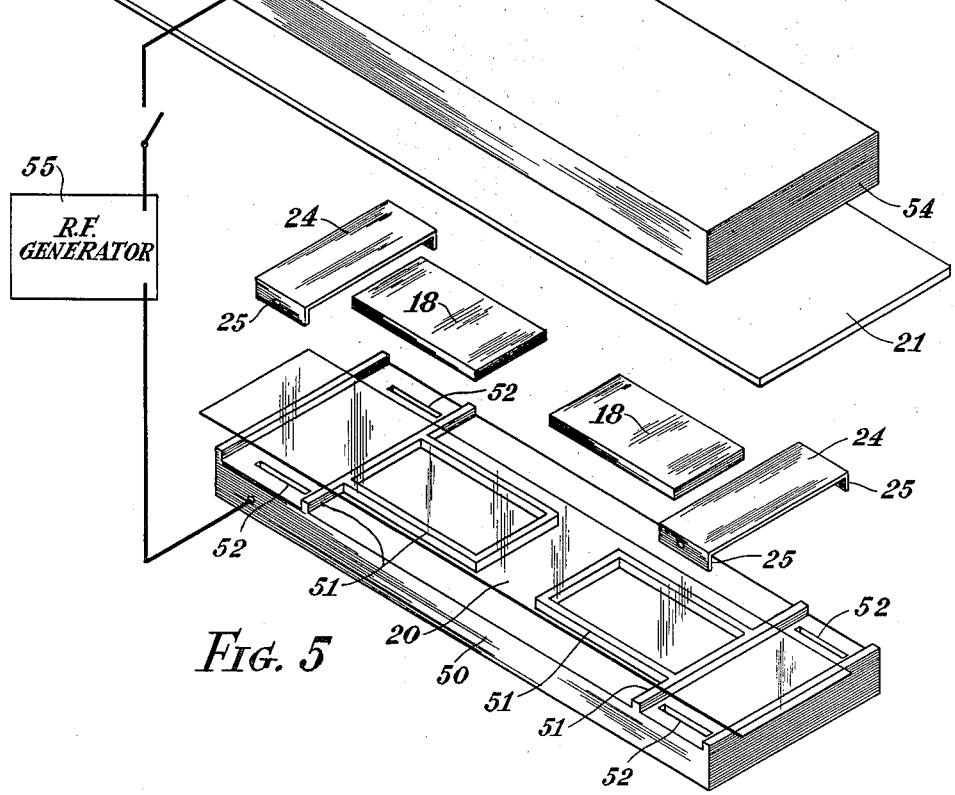
Figure 6:
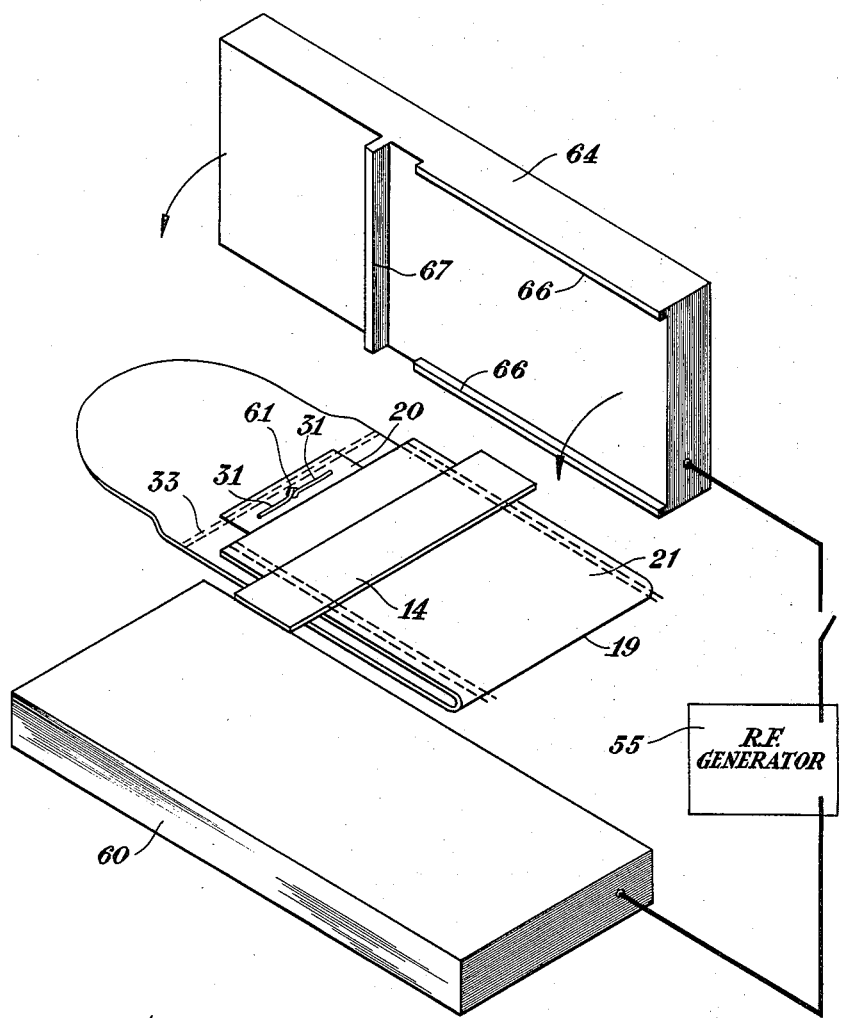

In order that the invention may be clearly understood and readily carried into effect we shall describe the same in more detail with reference to the accompanying drawings in which:

Fig. 1 is a perspective view of a film container according to the invention, in its closed position, Fig. 2 is an enlarged partly-sectional perspective view of a portion of the container in its open position, Fig. 3 is an elevational view of the container in its open position with the enclosed film partially removed therefrom, Fig. 4 is a perspective view of the film container opened up to illustrate details of construction, and Figs. 5 and 6 are exploded views useful in explaining the manufacture of the containers.

Referring now more particularly to Figs. 1–4, inclusive, of the drawings, the container for a sensitized film 10, which has a frangible sac 17 (Figure 2) containing a processing agent positioned in proximity thereto, comprises a flat pouch 11 of substantially water-proof flexible material, such as the thermoplastic vinyl, having an opening 12 (Figs. 2 and 3) at one end thereof to permit the insertion and the removal of the sensitized film 10 and its associated sac. Pouch 11 includes a relatively large flap 13 adjacent the opening 12 and also includes a fastener, in the form of a band 14 of the thermoplastic material, extending transversely of the pouch and attached at its ends to the sides of the pouch, for securing the flap over the opening, as represented in Fig. 1, to form a substantially water-tight and dust-proof closure.

The container also includes a pair of shielding elements in the form of flat lead plates 18—18 (see Figs. 2 and 4) having a predetermined thickness which establishes a predetermined permeability therefor to X or gamma rays, individually secured to opposed walls of the pouch 11. Plates 18—18 are secured in corresponding positions to the front and back interior walls of the pouch in the position shown in Fig. 2.

Referring now more particularly to Fig. 4, a fold line A—A corresponds to the bottom edge or end 19 of the pouch illustrated in Figs. 1 and 3. It will be seen from Fig. 4 that the plates 18—18 are symmetrically disposed on opposite sides of the fold line A—A and are maintained in their desired positions by a thin sheet 20 of flexible material, such as transparent vinyl, which overlays the plates and is bonded or coalesced to the outer sheet 21 of the pouch 11 by the application of heat and pressure, in a manner to be explained hereinafter, along lines 22—22 outlining the edges of the plates 18—18.

The container for the sensitized film also includes a rigid hollow member 23 (Fig. 2) preferably comprising a pair of U-shaped metallic channels 24—24 (see also Fig. 4), the free ends 25—25 of one being disposed between the free ends of the other when they are in mating engagement with the container completely assembled, as represented in Fig. 2 of the drawings. The free ends 25—25 of the channels 24 include mating protuberances and indentations which interlock the channels 24—24 when the free ends of one are assembled between the free ends of the other as illustrated in Fig. 2. Specifically, the free ends of the upper channel 25 represented in Fig. 4 contain a pair of protuberances 26—26 for interlocking engagement with a pair of indentations 27—27 in the free ends of the lower channel 25. These channels are preferably secured within the pouch adjacent the opening 12 and, when assembled to form the rigid hollow member 23, effectively protect the frangible sac of the sensitized film from rupture when the sensitized film and the attached sac are inserted in the pouch, with the sensitized film positioned between the lead plates 18—18 and the sac within the hollow member 23. Referring again to Fig. 4, the U-shaped channels 24—24 are secured to the outer sheet 21 of the pouch by means of the sheet 20, which extends over the large flat areas of the channels, and is coalesced to sheet 21 along the lines 29 at the edges of the channels.

The container preferably includes a metallic loop 30 (see Fig. 1) passing through a small opening 61 in the flap 13 and having a pair of arms 31—31 (see Figs. 2 and 4) extending laterally on the inside of the flap beneath the sheet 20, the latter being coalesced to the base of the flap 13 along a transverse line 33. A suitable cord or fastener (not shown) may be passed throught the loop 30 to permit the attachment of the container to the body of the wearer.

In order to more fully understand the simplicity of construction of the film container, there follows an explanation of the method of manufacture thereof. Referring now to Fig. 5 of the drawings, there is represented a metallic plate 50 having a plurality of ribs 51—51 projecting above the upper flat surface thereof. The single sheet 20 of transparent plastic material is placed over the ribs 51—51 in the manner indicated. Thereafter, the flat lead plates 18—18 are placed on top of sheet 20 adjacent those orienting ribs 51—51 which are shaped to outline the edges of the plates. Next, the channels 24—24 are placed over the sheet 20 in such a manner that the free ends 25—25 span the sheet and rest in aligning grooves 52—52 in the top surface of the plate 50. Following this operation, the sheet 21, which is somewhat wider and longer than the finished sheet making up the pouch 11 represented in Fig. 1, is placed over the various metallic members 18—18 and 24—24. An upper plate 54 is then placed on top of the sheet 21 and a slight pressure applied thereto. At the same time, current from a radio-frequency generator 55 is momentarily applied to the plates 50 and 54, which serve as condenser electrodes, and dielectric heating of the insulating sheets 20 and 21 takes place. The combination of heat and pressure bonds or coalesces the sheets along lines defined by the upstanding ribs 51—51 on the lower plate 50 and effectively secures the members 18—18 and 24—24 between the two sheets of insulation.

The completed assembly is then removed from between the condenser plates 50 and 54 and folded along a line corresponding to the fold line A-A represented in Fig. 4 of the drawings so that the resultant structure is similar to that represented between a pair of condenser plates 60 and 64 as illustrated in Fig. 6. Next, the loop 30 is pushed through the aperture 61 cut in the portion of the sheet 21 which will constitute the base of the flap for the container, and the arms 31—31 thereof are bent flat as represented. The folded assembly is then laid in its proper position and the fastening band 14 is laid across the folded assembly as represented. Thereafter, the upper condenser plate 64, which is provided with a pair of longitudinally extending ribs 66 and a transverse rib 67, is brought into aligned relation with the assembly resting on the lower condenser plate 60 and pressure is applied thereto. The condenser plates 60 and 64 are then momentarily connected in a circuit with a radio-frequency generator, similar to that shown in Fig. 5, which effects dielectric heating of the sheet members in the regions of the ribs 66 and 67, thereby bonding the band 14 to the folded assembly and also sealing the folded longitudinal edges of the pouch to make the water-tight joint. Simultaneously, the rib 67 coalesces one end of the sheet 20 to the sheet 21 along a transverse line 33 near the flattened arms 31—31 associated with the loop 30, thus, preventing the loop from being dislodged from its position in the opening 61.

In the next operation, the assembly is removed from between the plates 60 and 64 and the edges of the folded assembly are trimmed to remove the excess material, thereby providing a container having the outline represented in Fig. 3. If desired, the condenser plates 60 and 64 may be provided with suitable cutting edges (not shown) to perform a trimming operation after the various portions of the sheets 20 and 21 have been coalesced.

From the foregoing, it will be seen that the construction of the container is relatively simple and is adapted to be manufactured by mass production techniques making use of unskilled labor.

The folded sensitized film is inserted through the opening 12 in the flat pouch 11 in the manner represented in Fig. 3 of the drawings. The sensitized film, however, is pushed completely within the pouch so that the frangible sac 17 of processing agent is enclosed by the rigid hollow member 23 comprising the bipartite channels 24—24. The film assumes a position between the flat lead plates 18—18. Thereafter, the flap 13 is inserted beneath the fastening band 14 as represented in Fig. 1. The container and its contents may then be attached to the garment of an individual or a cord may be passed through the loop 30 so that it may be worn about the neck.

In order to remove the film the flap 13 is removed from beneath the fastening band 14 so as to uncover the opening 12 and give access to the sensitized film within the pouch 11. The film is removed by pulling it out by one end.

From the foregoing description and explanation of the use of the container and its contents, it will be clear that they may be subjected to considerable physical abuse while on the person of the wearer without injuring the sensitized film strips and the frangible sac of processing agent. It will also be seen that the flat pouch 11 of the container is substantially water-proof since it comprises a water-proof flexible material and an enlarged flap 13 of the same material which is tightly held to the body portion of the pouch by the band 14 thereby producing a substantially water-tight closure. Thus, the assembly is not subject to damage by rain or other water falling on the person of the wearer. Additionally, the closure structure for the opening 12 of the pouch is effectively dust-proof so that the film will not be contaminated. The container is made of readily available materials and the costs of manufacturing the container are small so that the assembly can be made available to the general public at a very low cost.

While we have shown and described the preferred embodiment of our invention, it will be understood that the latter may be embodied otherwise than as herein specifically illustrated or described in that in the illustrated embodiment certain changes in the details of construction and in the arrangement of parts may be made without departing from the underlying idea or principle of the invention within the scope of the appended claims.

What we claim is:

1. A wearable container for a sensitized film being provided with a frangible sac of a processing agent positioned in proximity thereto and which is capable when properly processed of providing an indication of the degree of exposure of the wearer thereof to X or gamma rays comprising, a flat pouch of substantially waterproof, flexible material having an opening to permit the insertion and removal of the sensitized film and sac and including a flap and a fastener for securing said flap over said opening to form a substantially water-tight closure, a pair of elements having a predetermined permeability to atomic radiation secured separately to opposite walls of said pouch, a rigid hollow member secured to said pouch for protecting said sac from rupture when said sensitized film and sac are inserted in said pouch with said sensitized film positioned between said elements, and a sheet of flexible material overlying said elements, portions of said member and said pouch and coalesced to predetermined portions of said pouch for securing said elements and said member to said pouch.

2. A wearable container for a sensitized film being provided with a frangible sac of a processing agent positioned in proximity thereto and which is capable when properly processed of providing an indication of the degree of exposure of the wearer thereof to X or gamma rays comprising, a flat pouch of substantially waterproof, flexible material having an opening to permit the insertion and removal of the sensitized film and sac and including a flap and a fastener for securing said flap over said opening to form a substantially water-tight closure, a pair of elements having a predetermined permeability to atomic radiation secured separately to opposite walls of said pouch, a rigid hollow member secured to said pouch for protecting said sac from rupture when said sensitized film and sac are inserted in said pouch with said sensitized film positioned between said elements, and a sheet of plastic material overlying said elements, portions of said member and said pouch, and coalesced along a plurality of lines to predetermined portions of said pouch for securing said elements and said member to said pouch.

3. A wearable container for a sensitized film being provided with a frangible sac of a processing agent positioned in proximity thereto and which is capable when properly processed of providing an indication of the degree of exposure of the wearer thereof to X or gamma rays comprising, a flat pouch of substantially waterproof, flexible material having an opening to permit the insertion and removal of the sensitized film and sac and including a flap and a fastener for securing said flap over said opening to form a substantially water-tight closure, a pair of elements having a predetermined permeability to atomic radiation secured separately to opposite walls of said pouch, and a rigid hollow member comprising a pair of U-shaped channels, the free ends of one channel being disposed in frictional interlocking engagement between the free ends of the other, said member being secured to said pouch in a position to protect the sac from rupture when the sensitized film and sac are inserted in said pouch with the sensitized film positioned between said elements.

4. A wearable container for a sensitized film being provided with a frangible sac of a processing agent positioned in proximity thereto and which is capable when properly processed of providing an indication of the degree of exposure of the wearer thereof to X or gamma rays comprising, a flat pouch of substantially waterproof, flexible material having an opening to permit the insertion and removal of the sensitized film and sac and including a flap and a fastener for securing said flap over said opening to form a substantially water-tight closure, a pair of elements having a predetermined permeability to atomic radiation secured separately to opposite walls of said pouch, and a rigid hollow member comprising a pair of U-shaped metallic channels, the free ends of one being disposed between the free ends of the other and said free ends including mating indentations and depressions interlocking said channels, said member being secured to said pouch thereby protecting the sac from rupture.

5. A wearable container for a sensitized film being provided with a frangible sac of a processing agent positioned in proximity thereto and which is capable when properly processed of providing an indication of the degree of exposure of the wearer thereof to X or gamma rays comprising, a flat pouch of substantially waterproof flexible plastic material having an opening at one end thereof to permit the insertion and removal of said sensitized film and sac and including a flap at said end and a band of said material attached at its end to said pouch and extending transversely thereof, said band being adapted to secure said flap over said opening to form a substantially water-tight closure, a pair of flat lead plates having a predetermined thickness establishing a predetermined permeability to atomic radiation and being secured separately to opposite, interior walls of said pouch, a rigid hollow member comprising a pair of oppositely disposed U-shaped metallic channels, the free ends of one being disposed between the free ends of the other and said free ends including mating indentations and depressions interlocking said channels, said member being secured within said pouch at said end thereof for protecting the sac from rupture when the sensitized film and sac are inserted in said pouch with the sensitized film positioned between said elements, and a sheet of plastic material overlying said plates, portions of said channels and said pouch, and coalesced along a plurality of lines to predetermined portions of said pouch for securing said elements and said member to said pouch.

References Cited in the file of this patent

UNITED STATES PATENTS

| | | |
|---|---|---|
| 1,284,027 | Zoerb | Nov. 5, 1918 |
| 1,688,699 | Gardner | Oct. 23, 1928 |
| 1,912,931 | Clay | June 6, 1933 |
| 2,237,346 | Gilfillan | Apr. 8, 1941 |
| 2,387,887 | Dimsdale | Oct. 30, 1945 |
| 2,483,991 | Wollan et al. | Oct. 4, 1949 |
| 2,565,378 | Land | Aug. 21, 1951 |
| 2,585,551 | Hofstadter | Feb. 12, 1952 |
| 2,600,063 | McCune | June 10, 1952 |
| 2,624,253 | Fairbank | Jan. 6, 1953 |
| 2,650,444 | Coyle et al. | Sept. 1, 1953 |